(12) United States Patent
Sumi et al.

(10) Patent No.: US 7,986,489 B2
(45) Date of Patent: Jul. 26, 2011

(54) DISK CONTROLLER, DISK DRIVE DEVICE, AND DISK CONTROL METHOD

(75) Inventors: Takanori Sumi, Akiruno (JP); Akio Mizuno, Oume (JP); Yasuhiko Ichikawa, Fussa (JP)

(73) Assignee: Kabushiki Kaisha Toshiba, Tokyo (JP)

(*) Notice: Subject to any disclaimer, the term of this patent is extended or adjusted under 35 U.S.C. 154(b) by 0 days.

(21) Appl. No.: 12/691,533

(22) Filed: Jan. 21, 2010

(65) Prior Publication Data

US 2010/0290150 A1    Nov. 18, 2010

(30) Foreign Application Priority Data

May 15, 2009   (JP) ................... 2009-119132

(51) Int. Cl.
*G11B 5/596*    (2006.01)
*G11B 21/02*    (2006.01)
(52) U.S. Cl. ............... 360/78.04; 360/75; 711/112
(58) Field of Classification Search ............... None
See application file for complete search history.

(56) References Cited

U.S. PATENT DOCUMENTS

| | | | |
|---|---|---|---|
| 6,658,535 B1* | 12/2003 | Megiddo et al. | 711/137 |
| 6,832,288 B2 | 12/2004 | Ohta et al. | |
| 7,058,760 B2 | 6/2006 | Ohta et al. | |
| 2001/0011323 A1 | 8/2001 | Ohta et al. | |
| 2005/0066120 A1 | 3/2005 | Ohta et al. | |
| 2007/0091500 A1* | 4/2007 | Manasse | 360/75 |

FOREIGN PATENT DOCUMENTS

| | | |
|---|---|---|
| JP | 1995-191813 | 7/1995 |
| JP | 2001-014111 | 1/2001 |
| JP | 2001-209500 | 8/2001 |
| JP | 2002-023962 | 1/2002 |
| JP | 2009-087460 | 4/2009 |

OTHER PUBLICATIONS

Notice of Reasons for Rejection for the Japanese Patent Application No. 2009-119132 issued by the Japan Patent Office on May 18, 2010.

* cited by examiner

*Primary Examiner* — Andrew L Sniezek
(74) *Attorney, Agent, or Firm* — Knobbe, Martens, Olson & Bear LLP

(57) ABSTRACT

According to one embodiment, a disk controller includes a receiver, a read-modify-write controller, and a wait controller. The receiver receives data in units of predetermined data length. The read-modify-write controller performs a read-modify-write operation when the receiver receives the data to write the data to a sector on a disk medium the rotation of which is controlled. The sector is longer than the predetermined data length. The wait controller delays the start of the read-modify-write operation by the read-modify-write controller for within the time which the disk medium takes to rotate once and which is substantially the same as the time required to control the read-modify-write operation.

11 Claims, 13 Drawing Sheets

DISK CONTROLLER, DISK DRIVE DEVICE, AND DISK CONTROL METHOD

CROSS-REFERENCE TO RELATED APPLICATIONS

This application is based upon and claims the benefit of priority from Japanese Patent Application No. 2009-119132, filed May 15, 2009, the entire contents of which are incorporated herein by reference.

BACKGROUND

1. Field

One embodiment of the invention relates to a disk controller that writes data to a sector of a disk medium, a disk drive device, and a disk control method.

2. Description of the Related Art

Magnetic disk devices have been used to store video data and audio data.

With the progress of computer technology, the faster write speed is increasingly required of such a magnetic disk device.

Besides, a long sector format is used as a result of an increase in the capacity of the magnetic disk device. Accordingly, a sector format is used in which a data length is longer than a unit of data exchanged between the magnetic disk device and a host.

Upon receipt of a command to write data that satisfies the physical sector size, the data is written to the magnetic disk device. On the other hand, in response to a command to write data that does not satisfy the physical sector size, a read-modify-write (RMW) operation is performed. Frequent RMW operations cause a delay in write speed.

Because of this, the RMW operation needs to be performed at an appropriate timing. Specifically, when the RMW operation is performed immediately after the receipt of a command to write fraction data (fraction write command) that does not satisfy the physical sector size, if the address of the subsequent write command is sequential, wasteful media access increases. This degrades the sequential write performance.

Recent technologies proposed in relation to the magnetic disk device take into account a command interval. According to such a technology, upon receipt of a write command that does not satisfy the physical sector size, the next write command is waited for a predetermined time. If a sequential write command is received during the wait time, a disk write operation is continued without performing an RMW operation. The disk write operation is changed to the RMW operation if a non-sequential write command is received.

This reduces RMW operations at sequential access in the magnetic disk device and prevents the performance degradation.

Japanese Patent Application Publication (KOKAI) No. 2001-209500 discloses a conventional technology in which if a new write command is received after a write command in response to which disk access has started, a disk write operation is performed by combining write data. Thus, the processing time delay is avoided.

In the conventional technology in which a disk write operation is continued without performing an RMW operation when a sequential write command is received during the wait time and the disk write operation is changed to the RMW operation when a non-sequential write command is received, the wait time is simply determined based on the command interval. Therefore, wasteful rotational latency occurs during a period from the preparation of an RMW operation to actual access, and thereby the performance degrades at the time of random access.

The conventional technology disclosed in Japanese Patent Application Publication (KOKAI) No. 2001-209500 does not take into account the timing to start disk access. Accordingly, rotational latency may occur depending on the timing.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, a disk controller comprises a receiver, a read-modify-write controller, and a wait controller. The receiver is configured to receive data in units of predetermined data length. The read-modify-write controller is configured to perform a read-modify-write operation when the receiver receives the data to write the data to a sector on a disk medium the rotation of which is controlled. The sector is longer than the predetermined data length. The wait controller is configured to delay the start of the read-modify-write operation by the read-modify-write controller for within the time which the disk medium takes to rotate once and which is substantially equal to the time required to control the read-modify-write operation.

According to another embodiment of the invention, a disk drive device comprises a rotation controller, a receiver, a read-modify-write controller, and a wait controller. The rotation controller is configured to control the rotation of a disk medium. The receiver is configured to receive data in units of predetermined data length. The read-modify-write controller is configured to perform a read-modify-write operation when the receiver receives the data to write the data to a sector on the disk medium. The sector is longer than the predetermined data length. The wait controller is configured to delay the start of the read-modify-write operation by the read-modify-write controller for within the time which the disk medium takes to rotate once and which is substantially equal to the time required to control the read-modify-write operation.

According to still another embodiment of the invention, there is provided a disk control method comprising: a rotation controller controlling the rotation of a disk medium; a receiver receiving data in units of predetermined data length; a read-modify-write controller performing a read-modify-write operation when the receiver receives the data to write the data to a sector on the disk medium, the sector being longer than the predetermined data length; and a wait controller delaying the start of the read-modify-write operation by the read-modify-write controller for within the time which the disk medium takes to rotate once and which is substantially equal to the time required to control the read-modify-write operation.

Figure 1:
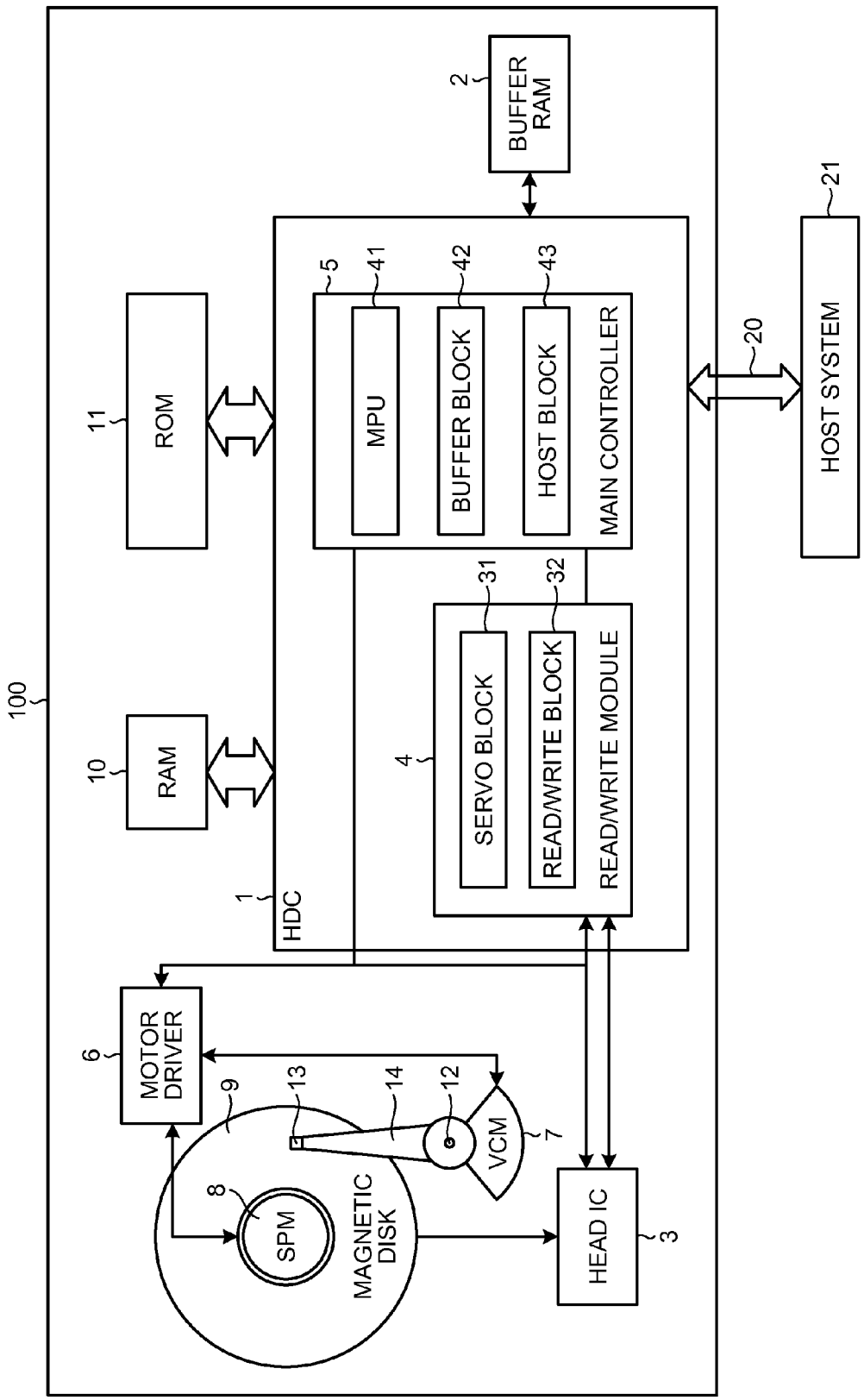
FIG. 1 is an exemplary block diagram of a hardware configuration of a hard disk drive (HDD) device according to an embodiment of the invention.

FIG. 1 is a block diagram of a hardware configuration of a hard disk drive (HDD) device 100 according to an embodiment of the invention. As illustrated in FIG. 1, the HDD device 100 comprises a hard disk controller (HDC) 1, a buffer random access memory (RAM) 2, a motor driver 6, a voice coil motor (VCM) 7, a spindle motor (SPM) 8, a magnetic disk 9, a RAM 10, a read only memory (ROM) 11, a magnetic head 13, an arm 14, a spindle 12, and a head integrated circuit (IC) 3. The HDD device 100 is connected to a host system 21 via a transmission path 20.

The SPM 8 is a motor that steadily rotates the magnetic disk 9. The VCM 7 comprises a magnet and a drive coil (both not illustrated), and is driven by power supplied from the motor driver 6 to move the magnetic head 13 to a desired position.

The motor driver 6 controls current that flows through the SPM 8 and the VCM 7 to drive them.

Figure 2:
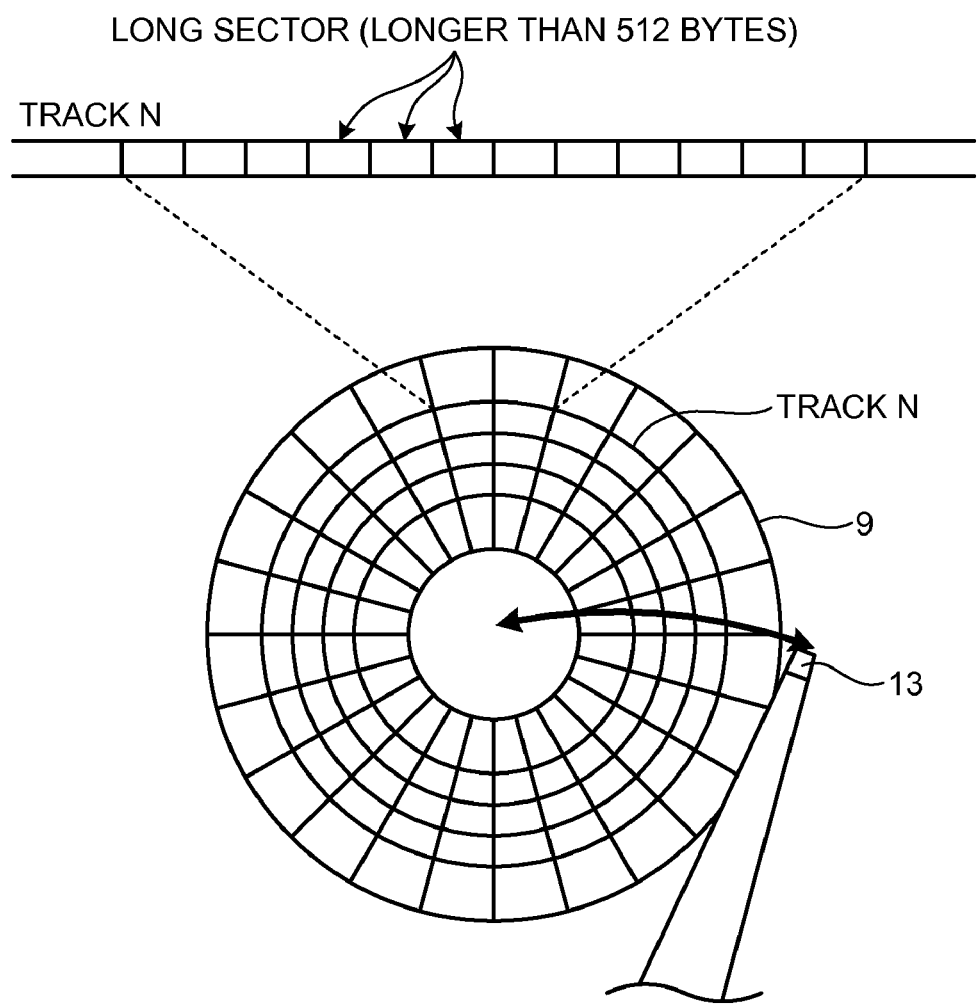
FIG. 2 is an exemplary conceptual diagram of the structure of a magnetic disk in the embodiment.

The magnetic disk 9 is provided with a readable/writable data area. FIG. 2 is a conceptual diagram of the structure of the magnetic disk 9. As illustrated in FIG. 2, a track is formed on the magnetic disk 9 with respect to each of the different radii. As with a track N illustrated in FIG. 2, each track has an area (data area) to store data received from the host system 21. The data area includes a plurality of sectors. With this configuration of the magnetic disk 9, when moving along the radial direction of the magnetic disk 9, the magnetic head 13 scans a sector of a track. While scanning the sector on the magnetic disk 9, the magnetic head 13 reads data from or writes data to the sector.

It is herein assumed that the magnetic disk 9 is formatted in a long sector format, and each sector is longer than 512 bytes. Incidentally, the sector size is only required to be longer than 512 bytes and, in the embodiment, it is assumed that the sector size is 1024 bytes.

Referring back to FIG. 1, the magnetic head 13 is supported by the arm 14. The magnetic head 13 reads the position information of a track from servo data and also scans the magnetic disk 9 to read or write data. The arm 14 is driven by the VCM 7 and rotates about the spindle 12 to move the magnetic head 13 in the radial direction of the magnetic disk 9.

The head IC 3 has the function of amplifying, for example, a weak signal read by the magnetic head 13.

The ROM 11 stores a control program used by the HDC 1 (for example, a microprocessing unit (MPU) 41). The RAM 10 is used as a work area where the HDC 1 (for example, the MPU 41) stores a variable prime number, and the like.

The HDC 1 is an integrated circuit (IC) designed to control the HDD device 100. The HDC 1 comprises a read/write module 4 and a main controller 5.

The read/write module 4 comprises a servo block 31 and a read/write block 32. The servo block 31 mainly performs signal processing necessary to position the magnetic head 13. The read/write block 32 performs signal processing necessary to read/write data.

The main controller 5 comprises the MPU 41, a buffer block 42, and a host block 43.

The host block 43 controls an interface to the host system 21. The host block 43 exchanges data with the host system 21 in units of 512 bytes. The buffer block 42 controls the buffer RAM 2.

The MPU 41 performs read/write operation. The MPU 41 searches for a track to read data from or write data to the track, and manages the position for the read/write operation. The MPU 41 issues an instruction to the read/write module 4 upon reading data from or writing data to the track.

Described below is control based on a read request. An analog signal read from the magnetic head 13 upon positioning the magnetic head 13 and amplified by the head IC 3 is sent to the read/write module 4 of the HDC 1. The read/write module 4 decodes the amplified analog signal. The main controller 5 generates data to be transmitted to the host system 21 from the decoded analog signal. The data is once stored in the buffer RAM 2, and then transmitted to the host system 21.

Described below is control based on a write request. Data transmitted from the host system 21 to the main controller 5 is once stored in the buffer RAM 2, and then sent to the read/write module 4 by the main controller 5. The read/write module 4 encodes the data. The data is written to the magnetic disk 9 by the magnetic head 13 through the head IC 3.

The buffer RAM 2 stores read data and the like. The data stored in the buffer RAM 2 is output to the host system 21.

After receipt of a write request from the host system 21 via the host block 43, if only data of 512 bytes has been received from the host system 21 as data to be written to one physical sector, the MPU 41 waits for a predetermined time not to perform a read-modify-write (RMW) operation.

Data to be written to one physical sector which is 512 bytes long will be hereinafter referred to as "fraction data".

Figure 3:
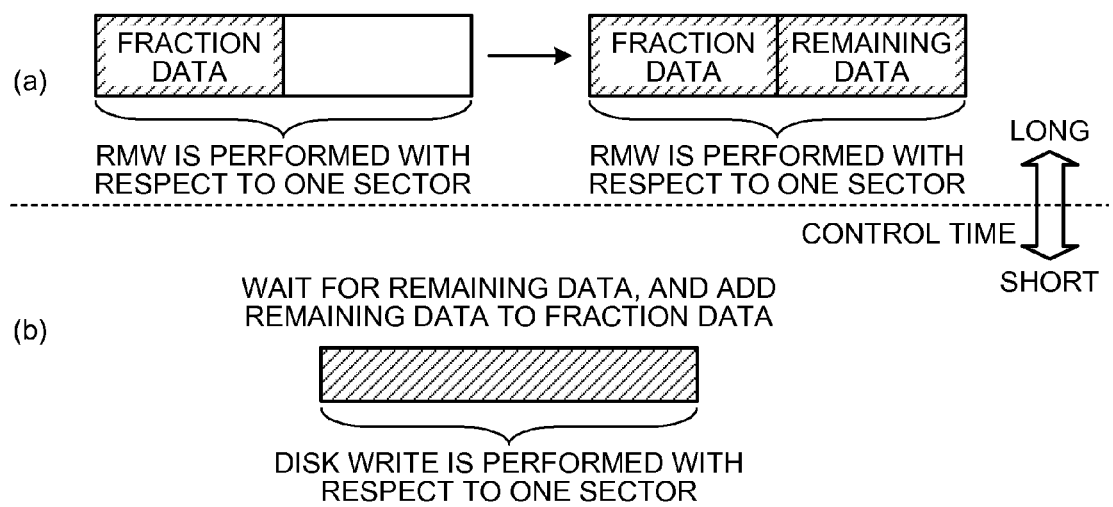
FIG. 3 is an exemplary schematic diagram for explaining the difference in control time between a read-modify-write (RMW) operation and a disk write operation performed with respect to the magnetic disk in the embodiment.

FIG. 3 is a schematic diagram for explaining the difference in control time between an RMW operation and a disk write operation with respect to the magnetic disk 9. As indicated by (a) in FIG. 3, if data to be written to one physical sector is fraction data, the main controller 5 performs an RMW operation to write the fraction data. After that, if receiving remaining data to be sequentially written from the host system 21, the main controller 5 performs an RMW operation again to write the remaining data. The RMW operation necessitates disk read and disk write, and thereby requires considerable time.

On the other hand, as indicated by (b) in FIG. 3, when receiving fraction data from the host system 21, if the main controller 5 waits until receiving remaining data from the host system 21 and writes the fraction data and the remaining data together to one sector, although the disk write operation necessitates the wait time, it is required only once. Thus, processing time can be reduced.

A conventional technology will be described. according to the conventional technology, wait time is determined according to an interval between commands from the host system 21.

Figure 4:
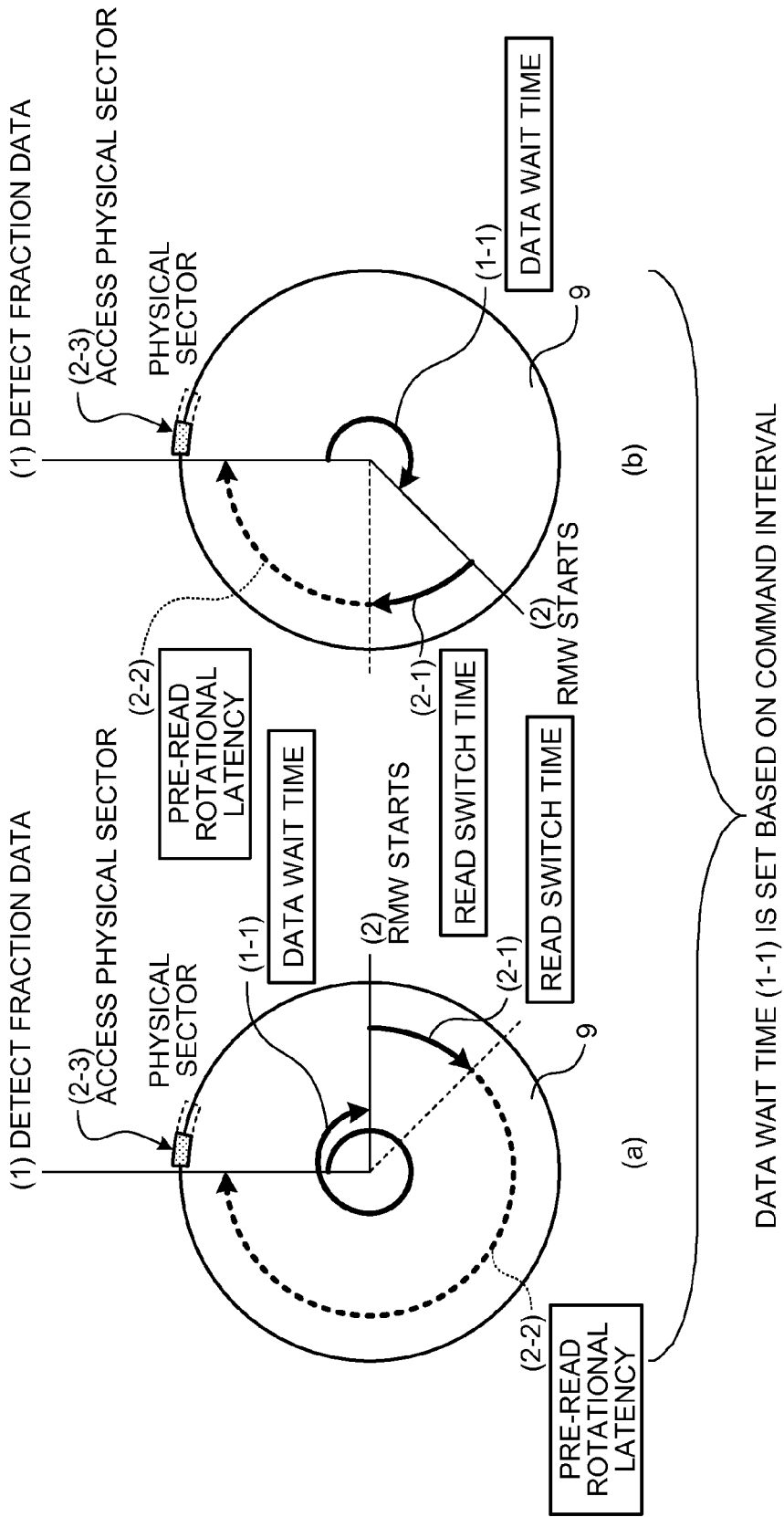
FIG. 4 is an exemplary schematic diagram for explaining wait time and timing to perform an RMW operation according to a conventional technology.

FIG. 4 is a schematic diagram for explaining wait time and timing to perform an RMW operation according to the conventional technology. Only data wait time based on a command interval differs between (a) and (b) in FIG. 4. That is, the data wait time is determined based only on a command interval, and does not take into account the rotation control of the magnetic disk.

As a specific procedure, a conventional HDC (1) detects only a write request of fraction data with respect to a physical sector. Incidentally, it is assumed that the HDC sequentially performs disk write operations before the physical sector. After that, the HDC (1-1) waits for a sequential write request for a data wait time predetermined based on a command interval.

In the example of FIG. 4, to clarify the relationship between wait time and a position on the magnetic disk, data wait time is represented by an angle by which the magnetic disk rotates during the wait time. Similarly, read switch time and rotational latency time, which will be described later, are each represented by an angle by which the magnetic disk rotates during the time.

When the conventional HDC receives a sequential write request during the data wait time and thereby received data reach the physical sector size, the HDC continues a disk write operation by adding newly received data (hereinafter, "remaining data") to the fraction data without performing an RMW operation.

On the other hand, if the conventional HDC receives a non-sequential write request or receives no write request from the host system 21 during the data wait time, the HDC (2) starts control to perform an RMW operation. Until access to a physical sector after the read switch time indicated by (2-1), pre-read rotational latency occurs as indicated by (2-2). After that, (2-3) the physical sector is accessed.

In the example of FIG. 4, the data wait time is determined based only on the command interval. Therefore, wasteful rotational latency (pre-read rotational latency) occurs at the start of an RMW operation. As a result, the performance degrades at random access in which a switch to an RMW operation frequently occurs. Besides, if the data wait time is determined based on the command interval, there is the case that a write request is received after the lapse of the data wait time. Therefore, according to the embodiment, the HDD device 100 determines data wait time not to cause the above problems.

Figure 5:
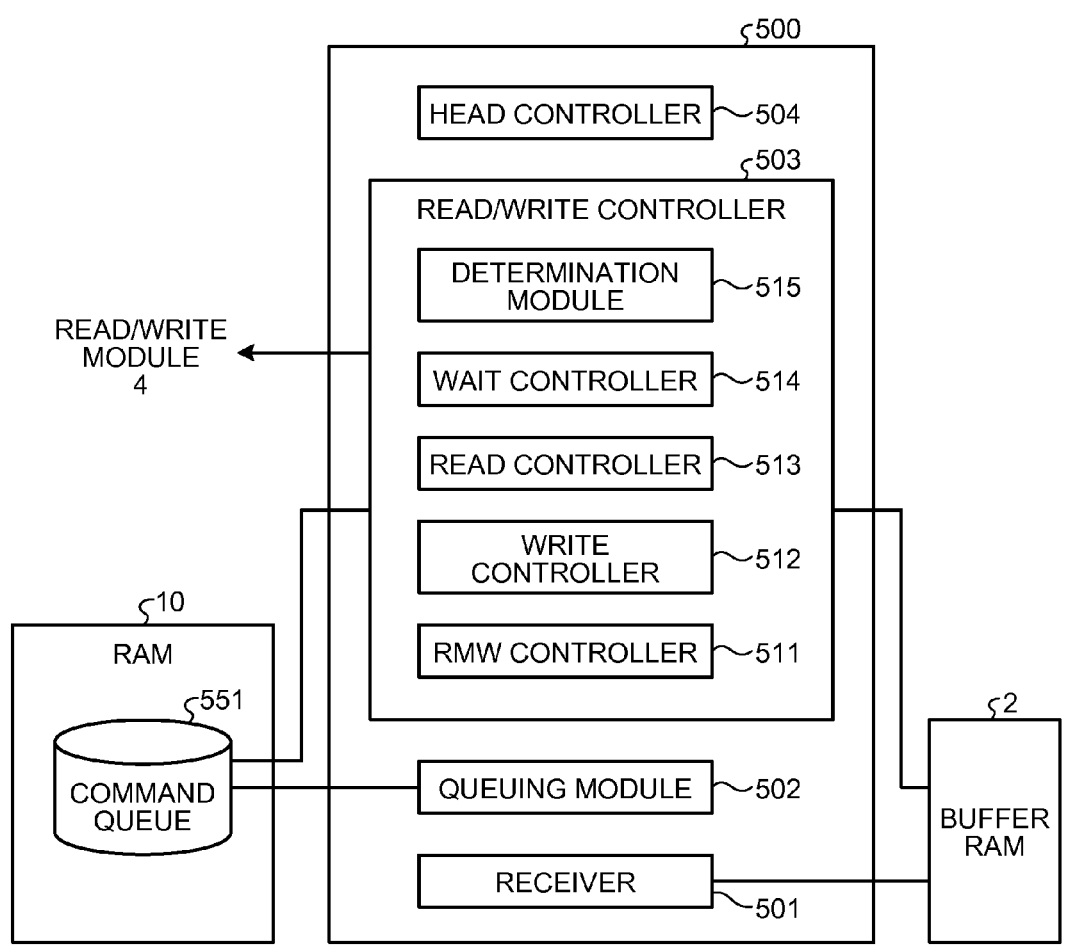
FIG. 5 is an exemplary block diagram of a software configuration of the HDD device in the embodiment.

First, the operation of the MPU 41 in the main controller 5 will be described. FIG. 5 is a block diagram of a software configuration 500 of the HDD device 100 implemented by a control program (not illustrated).

As illustrated in FIG. 5, the HDD device 100 comprises, as the software configuration 500, a receiver 501, a queuing module 502, a read/write controller 503, a head controller 504.

The head controller 504 controls the motor driver 6 to control the magnetic disk 9 and the magnetic head 13.

The receiver 501 receives a command and data from the host system 21. The length of the data is 512 bytes. Upon receipt of data to be written, the receiver 501 temporarily stores the data in the buffer RAM 2.

The queuing module 502 stores a command received from the host system 21 in a command queue 551 in the RAM 10.

In the embodiment, the queuing module 502 enqueues a read command to read data from the magnetic disk 9 and a write command to write data to the magnetic disk 9 in the command queue 551 as commands received by the receiver 501.

The read/write controller 503 comprises an RMW controller 511, a write controller 512, a read controller 513, a wait controller 514, and a determination module 515. The read/write controller 503 controls data read and write operations with respect to a sector on the magnetic disk 9. Accordingly, the read/write controller 503 sends a write command and a read command with respect to the sector to the read/write module 4. According to the commands, signal processing is performed for the head IC 3.

The read controller 513 controls reading from the magnetic disk 9 when a read command is enqueued in the command queue 551.

The RMW controller 511 performs an RMW operation of fraction data with respect to a sector on the magnetic disk 9 the rotation of which is controlled when a write command is enqueued in the command queue 551 and the buffer RAM 2 stores only the fraction data. Before the start of the RMW operation, the wait controller 514 performs wait control.

The wait controller 514 delays the start of an RMW operation of the RMW controller 511 for within the time taken for the magnetic disk 9 to rotate once until the time just before preparation for the RMW operation starts with respect to a sector using fraction data that the receiver 501 has received.

The time just before preparation for the RMW operation starts refers to the time before the start of pre-read for the RMW operation with respect to the sector by a time period substantially the same time period as required to control the RMW operation (read switch in the embodiment). With this, a write operation can be performed with respect to a desired sector after the read switch with almost no rotational latency. Incidentally, it is assumed herein that the time just before preparation for an RMW operation starts is preset based on the read switch time measured actually.

Figure 6:
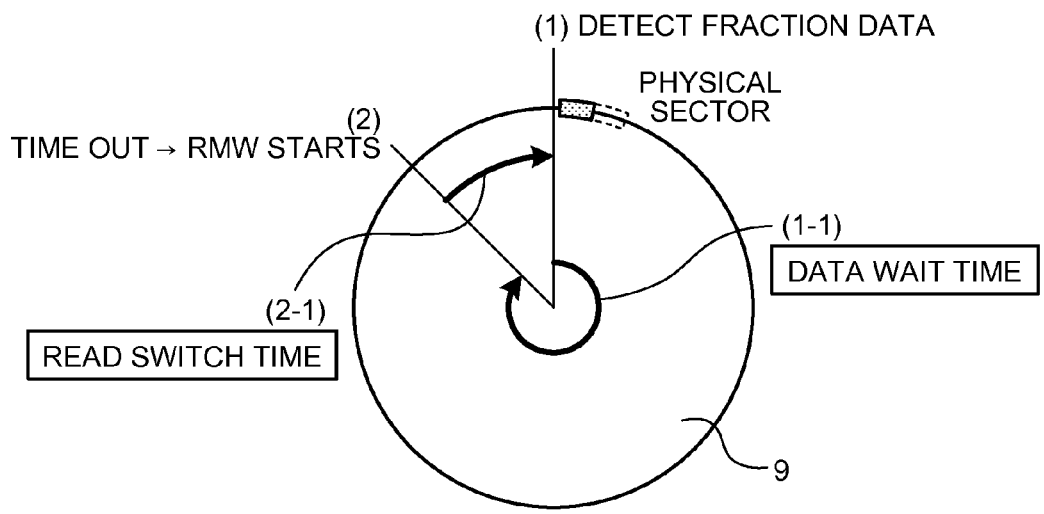
FIG. 6 is an exemplary schematic diagram for explaining data wait time of a wait controller in the embodiment.

FIG. 6 is a schematic diagram for explaining the data wait time of the wait controller 514. In FIG. 6, as in FIG. 4, each time is represented by an angle by which the magnetic disk 9 rotates during the time. This applies to the subsequent drawings as well.

(1) The read/write controller 503 detects a write command that constitutes a sequential write operation from the command queue 551. The read/write controller 503 also detects that the buffer RAM 2 stores only fraction data and that rotational latency starts.

In this case, the wait controller 514 delays the start of an RMW operation by the RMW controller 511 during data wait time to wait for receipt of the next data by the receiver 501. The data wait time is assumed to be until the time just before preparation for pre-read for the RMW operation starts (the time before the start of the pre-read by a time period substantially the same time period as required for read switch). In this manner, the RMW operation is delayed until data to be written in response to write requests are received. FIG. 6 illustrates an example in which a sequential write request is not received before the time.

When the receiver 501 receives no sequential write request (i.e., receives a non-sequential write request or receives no write request), the RMW controller 511 starts the RMW operation. Thus, according to the embodiment, pre-read rotational latency can be reduced compared to the conventional technology previously described in connection with FIG. 4.

With the above control of the embodiment, even if an RMW operation is started in the middle of data wait, the rotational latency is the same. Therefore, there is no need to terminate the data wait. Moreover, data wait time is determined by paying attention to the position of a physical sector to be written on the magnetic disk 9. This eliminates wasteful rotational latency that occurs at the start of an RMW operation as well as reducing the performance degradation due to the RMW operation at random access.

As described above, if data wait time as indicated by (b) in FIG. 4 is determined based on a command interval, there is the case that the HDD device 100 receives a write request from the host system 21 after the lapse of the data wait time. Even in such a case, an RMW operation can be performed properly because the RMW operation is delayed until just before the pre-read can be performed.

When the receiver 501 receives write data together with a write request during the data wait time of the wait controller 514, the write controller 512 performs a disk write operation with respect to a sector on the magnetic disk 9 using a combination of data received by the receiver 501 a plurality of times instead of an RMW operation by the RMW controller 511.

Figure 7:
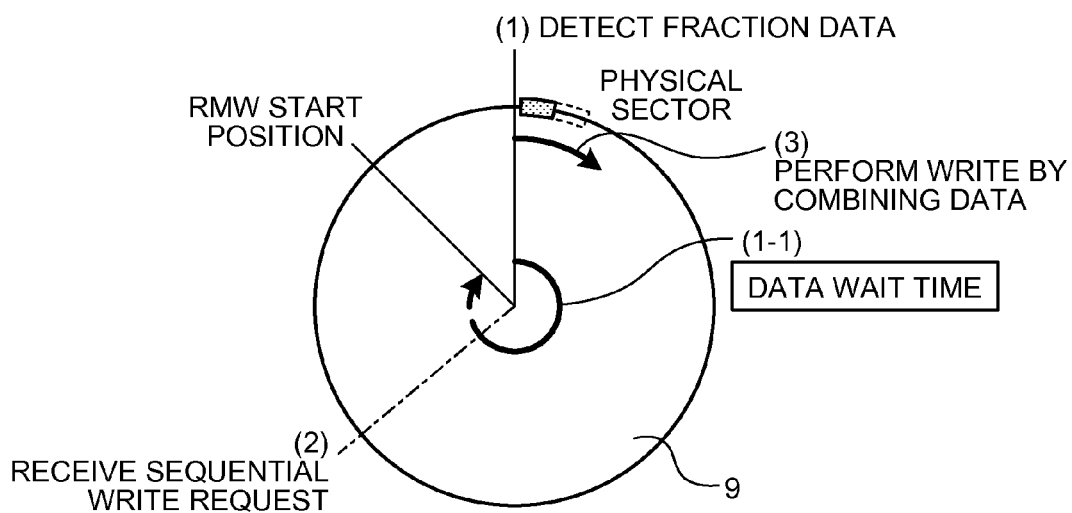
FIG. 7 is an exemplary schematic diagram for explaining the case where a write request is received during the data wait time of the wait controller in the embodiment.

FIG. 7 is a schematic diagram for explaining the case where a write request is received during the data wait time of the wait controller 514. As in FIG. 6, first, (1) the read/write controller 503 detects a write command that constitutes a sequential write operation from the command queue 551. The read/write controller 503 also detects that the buffer RAM 2 stores only fraction data and that rotational latency starts. With this, the wait controller 514 delays the start of an RMW operation by the RMW controller 511.

(2) If the receiver 501 receives a sequential write request during the data wait time, the RMW controller 511 does not perform RMW control. (3) The write controller 512 adds remaining data received together with the sequential write request to the fraction data, and performs a disk write operation with respect to a physical sector as a write destination.

The determination module 515 determines whether a sequential write request has been received after the operation of the RMW controller 511. When the determination module 515 determines that a sequential write request has been received, the data wait time of the wait controller 514 is extended by the time taken for the magnetic disk 9 rotates once more.

That is, taking into account sequential access, if a sequential write request is received after an RMW operation, an unnecessary RMW operation is performed. To avoid this, the determination module 515 determines whether a sequential write (access) request has been received after the RMW operation. When the determination module 515 determines that a sequential write request has been received, the data wait time is temporarily extended.

Figure 8:
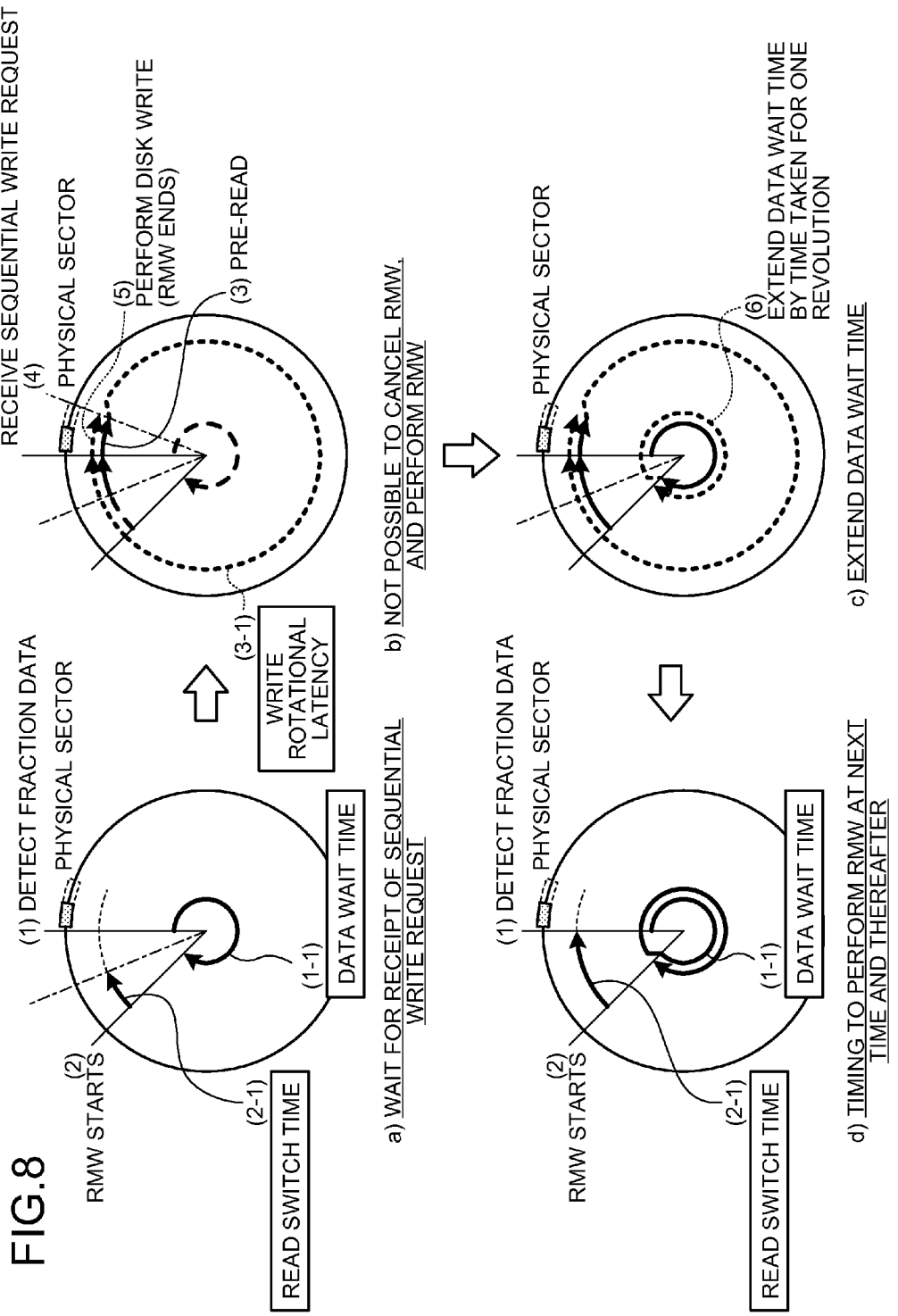
FIG. 8 is an exemplary schematic diagram for explaining the case where a sequential write request is received after an RMW operation by an RMW controller in the embodiment.

FIG. 8 is a schematic diagram for explaining the case where a sequential write request is received after an RMW operation by the RMW controller 511. As in FIGS. 6 and 7, first, (1) the read/write controller 503 detects a write command that constitutes a sequential write operation from the command queue 551. The read/write controller 503 also detects that the buffer RAM 2 stores only fraction data and that rotational latency starts. With this, the wait controller 514 delays the start of an RMW operation by the RMW controller 511.

If the receiver 501 does not receive a (sequential) write request during the data wait time, (2) the RMW controller 511 starts the RMW operation.

(3) The RMW controller 511 performs pre-read with respect to a physical sector. (4) If the receiver 501 receives a sequential write request, it is not possible to cancel the RMW operation to switch it to a disk write operation at that point. (5) The RMW controller 511 performs a disk write operation after the pre-read without canceling the RMW operation. After that, the RMW controller 511 performs the RMW operation using data to be written in response to the command received by the receiver 501 (4). In this manner, a considerable time is taken until the data write operation is completed. Further, if write requests (commands) are issued thereafter at similar command intervals, an RMW operation is performed frequently, which degrades the performance.

To cope with this, the determination module 515 determines whether all data has been received according to sequential write requests after the operation of the RMW controller 511. In the example of FIG. 8, a sequential write request is received during the RMW operation, and therefore, the determination module 515 determines that all data has been received. In this case, the determination module 515 determines that sequential access is performed, and (6) extends the wait time of the wait controller 514 by the time taken for the magnetic disk 9 to rotate once. In other words, the data wait time to receive all data corresponding to write requests is extended by the time taken for one revolution of the magnetic disk 9.

As described above, even when the receiver 501 receives data together with a sequential write request and all write data has been received with respect to a physical sector, if an RMW operation by the RMW controller 511 cannot be canceled, the RMW operation is performed. The determination module 515 extends the wait time of the wait controller 514 such that an RMW operation is not started before a write request is received at the next time and thereafter. With this, as indicated by (d) in FIG. 8, the start of an RMW operation by the RMW controller 511 is delayed thereafter for within the time which the magnetic disk 9 takes to rotate not less than once and not more than twice until the time just before preparation for the RMW operation starts with respect to a sector.

Figure 9:
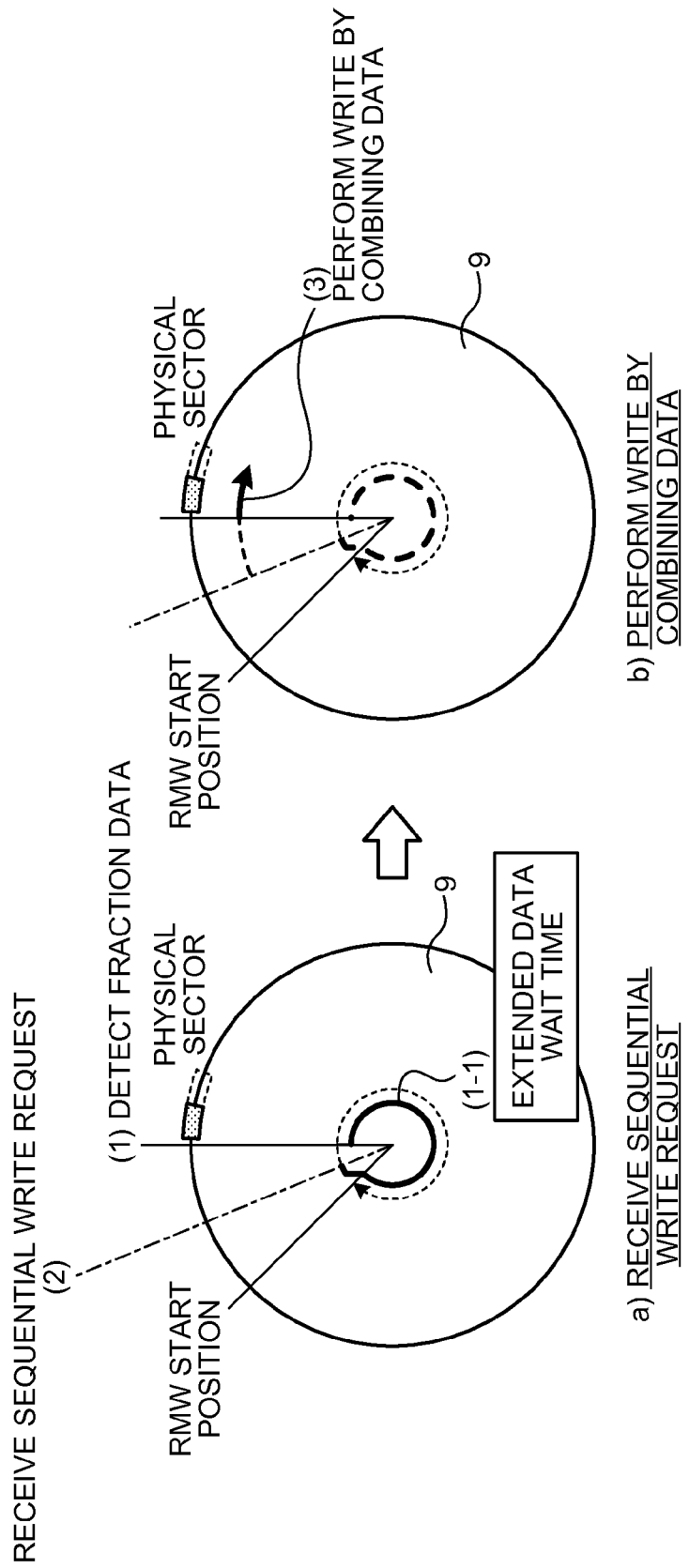
FIG. 9 is an exemplary schematic diagram for explaining the case where a write request is received during extended data wait time of the wait controller in the embodiment.

A description will be given of the case where wait time is extended. FIG. 9 is a schematic diagram for explaining the case where a write request is received during extended data wait time. First, (1) the read/write controller 503 detects a write command that constitutes a sequential write operation from the command queue 551. The read/write controller 503 also detects that the buffer RAM 2 stores only fraction data and that rotational latency starts. With this, the wait controller 514 delays the start of an RMW operation by the RMW controller 511. Since the data wait time has been extended by the time taken for one revolution of the magnetic disk 9, the wait controller 514 delays the RMW operation by the RMW controller 511 for within the time taken for the magnetic disk 9 to rotate not less than once and not more than twice until the time just before preparation for the RMW operation starts with respect to a sector to be accessed.

(2) If the receiver 501 receives a sequential write request during the extended data wait time, the RMW controller 511 does not perform RMW control. (3) The write controller 512 adds remaining data received together with the sequential write request to the fraction data, and performs a disk write operation with respect to a physical sector as a write destination. In the example of FIG. 9, a disk write operation is performed when a sequential write request is received within the time taken for the magnetic disk 9 to rotate twice until the time just before preparation for the RMW operation starts with respect to a sector to be accessed. Thus, frequent RMW operations can be avoided, and the performance degradation can be reduced.

Figure 10:
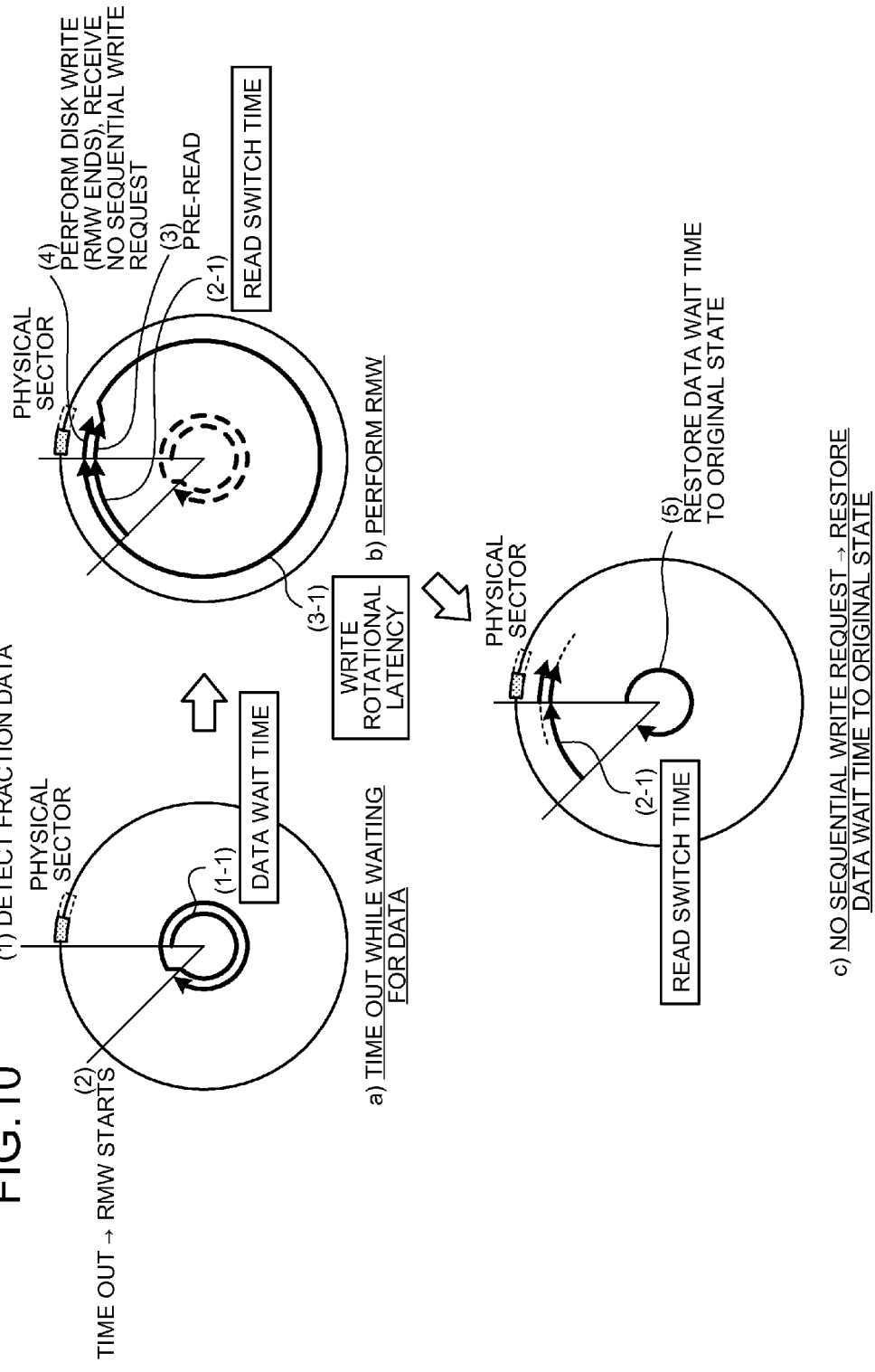
FIG. 10 is an exemplary schematic diagram for explaining the case where a sequential write request is not received during the extended data wait time of the wait controller in the embodiment.

Besides, according to the embodiment, if no sequential write request is received after data wait time is extended, the HDD device 100 restores the data wait time to its original state. FIG. 10 is a schematic diagram for explaining the case where a sequential write request is not received during extended data wait time.

First, (1) the read/write controller 503 detects a write command that constitutes a sequential write operation from the command queue 551. The read/write controller 503 also detects that the buffer RAM 2 stores only fraction data and that rotational latency starts.

The wait controller 514 delays the start of an RMW operation by the RMW controller 511 by extended data wait time (the time taken for the magnetic disk 9 to rotate not less than once and not more than twice until the time just before preparation for the RMW operation starts with respect to a sector).

When the receiver 501 receives no sequential write request (i.e., receives a non-sequential write request or receives no write request) during the extended data wait time, (2) the RMW controller 511 starts the RMW operation.

(3) The RMW controller 511 performs pre-read with respect to a physical sector. (4) A disk write operation is performed after the pre-read while the RMW controller 511 does not cancel the RMW operation. The receiver 501 has not received a sequential write request when the RMW operation ends.

In this case, the determination module 515 determines that a sequential write operation is completed, and (5) restores the data wait time to its original state. That is, the determination module 515 changes the data wait time such that the wait controller 514 delays the start of an RMW operation by not more than the time taken for the magnetic disk 9 to rotate once.

More specifically, as indicated by (c) in FIG. 10, the wait controller 514 delays the start of an RMW operation by the RMW controller 511 for within the time taken for the magnetic disk 9 to rotate once until the time (or a medium position) just before preparation for pre-read for an RMW operation starts.

Figure 11:
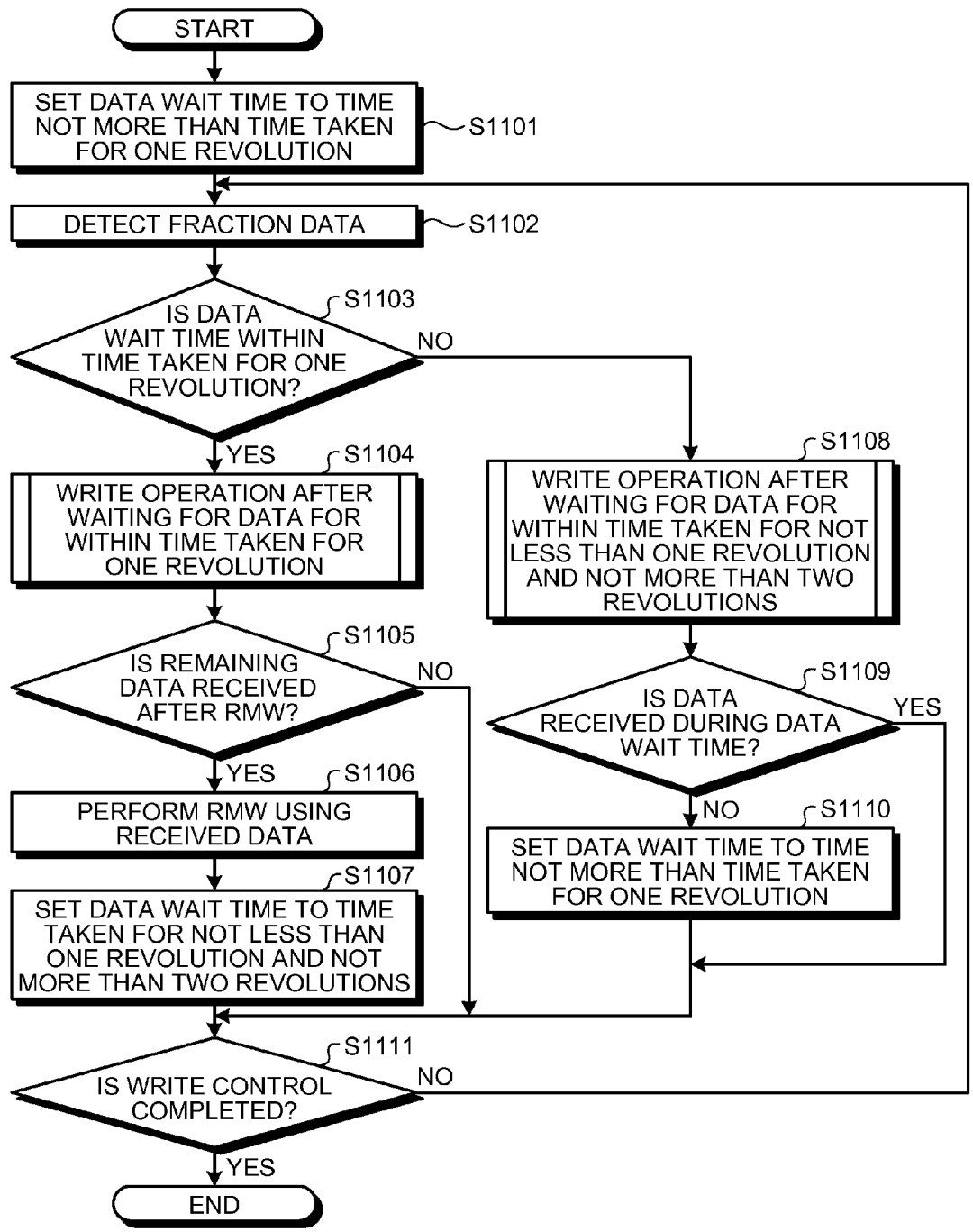
FIG. 11 is an exemplary flowchart of the operation of the HDD device for write control in the embodiment.

A description will be given of the write control of the HDD device 100 configured as above. FIG. 11 is a flowchart of the operation of the HDD device 100 according to the embodiment.

First, the read/write controller 503 sets the data wait time of the wait controller 514 to the time not more than the time taken for the magnetic disk 9 to rotate once until the time (or a medium position) just before preparation for pre-read for an RMW operation starts (S1101).

The read/write controller 503 then detects a write command that constitutes a sequential write operation from the command queue 551. The read/write controller 503 also detects that the buffer RAM 2 stores only fraction data and that rotational latency starts (S1102).

After that, the wait controller 514 determines whether the set data wait time is within the time taken for one revolution of the magnetic disk 9 (S1103).

When the wait controller 514 determines that the set data wait time is within the time taken for one revolution of the magnetic disk 9 (Yes at S1103), an RMW operation or a disk write operation is performed after the wait controller 514, the RMW controller 511, and the write controller 512 perform data wait control for within the time taken for the magnetic disk 9 to rotate once (S1104). This process will be described in detail later.

The determination module 515 determines whether the receiver 501 has received remaining data together with a sequential write request after the RMW operation (S1105). When the determination module 515 determines that the receiver 501 has not received remaining data (No at S1105), the process moves to S1111 without specific operation.

On the other hand, when the determination module 515 determines that the receiver 501 has received remaining data together with a sequential write request (Yes at S1105), the RMW controller 511 performs an RMW operation to write the remaining data to a sector (S1106).

After that, the determination module 515 sets the data wait time of the wait controller 514 to the time taken for the magnetic disk 9 to rotate not less than once and not more than twice until the time just before preparation for an RMW operation starts with respect to a sector (before the start of pre-read by the time substantially the same time as required for read switch) (S1107).

When the wait controller 514 determines that the set data wait time is not within the time taken for one revolution of the magnetic disk 9 (No at S1103), an RMW operation or a disk write operation is performed after the wait controller 514, the RMW controller 511, and the write controller 512 perform data wait control for within the time taken for the magnetic disk 9 to rotate not less than once and not more than twice (S1108). This process will be described in detail later.

The determination module 515 determines whether the receiver 501 has received remaining data together with a sequential write request during the data wait time (S1109). When the determination module 515 determines that the receiver 501 has received remaining data (Yes at S1109), the process moves to S1111 without specific operation.

On the other hand, when the determination module 515 determines that the receiver 501 has not received remaining data (No at S1109), the determination module 515 sets the data wait time of the wait controller 514 to not more than the time taken for one revolution of the magnetic disk 9 until the time just before preparation for an RMW operation starts with respect to a sector (S1110).

Thereafter, the read/write controller 503 determines whether the write control is completed (S1111). When the read/write controller 503 determines that the write control is not completed (No at S1111), the process is repeated from S1102. On the other hand, when the read/write controller 503 determines that the write control is completed (Yes at S1111), the process ends.

Figure 12:
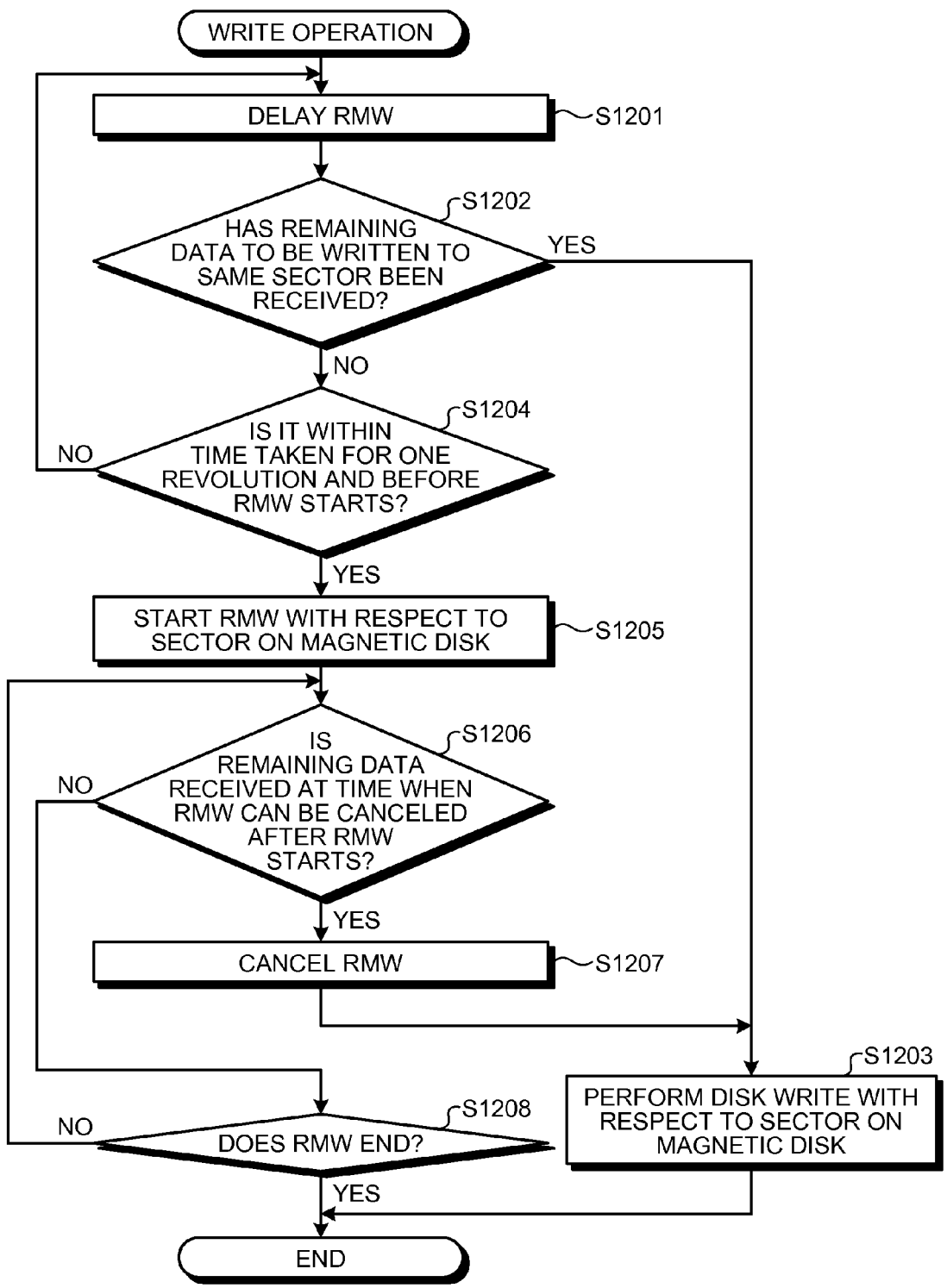
FIG. 12 is an exemplary flowchart of the operation of the HDD device for an RMW operation or a disk write operation when the data wait time is within one revolution time in the embodiment.

A description will be given of the process at S1104 in FIG. 11 performed by the HDD device 100. FIG. 12 is a flowchart of the operation of the HDD device 100 for the above process.

First, the wait controller 514 delays the RMW operation by the RMW controller 511 using the fraction data (S1201).

The determination module 515 determines whether the receiver 501 has received remaining data together with a sequential write request during the wait time (S1202).

When the determination module 515 determines that the receiver 501 has received remaining data (Yes at S1202), the RMW controller 511 cancels the RMW operation, and the write controller 512 performs a disk write operation with respect to a sector on the magnetic disk 9 (S1203).

On the other hand, when the determination module 515 determines that the receiver 501 has not received remaining data (No at S1202), the wait controller 514 determines whether it is within the time taken for one revolution of the magnetic disk 9 just before preparation for the RMW operation starts (S1204). When the wait controller 514 determines that it is not the time just before preparation for the RMW operation starts (No at S1204), the process is repeated from S1201.

When the wait controller 514 determines that it is the time just before preparation for the RMW operation starts (Yes at S1204), the RMW controller 511 starts the RMW operation with respect to a sector on the magnetic disk 9 (S1205).

The determination module 515 then determines whether the receiver 501 has received remaining data at the time when an RMW operation can be canceled after the RMW operation starts (S1206).

When the determination module 515 determines that the receiver 501 has received remaining data (Yes at S1206), the RMW operation by the RMW controller 511 is canceled, and the write controller 512 adds the remaining data to the fraction data and performs a disk write operation with respect to a sector on the magnetic disk 9 (S1203).

Figure 13:
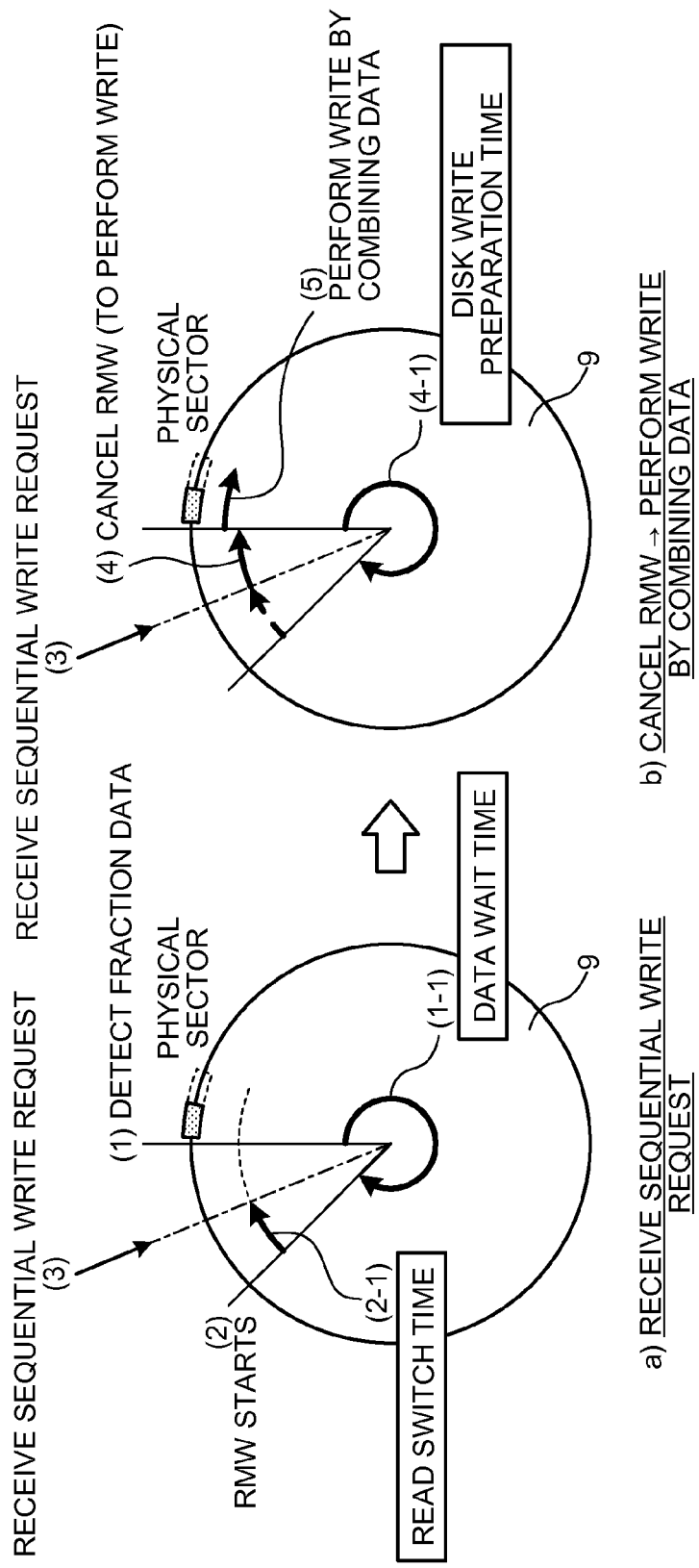
FIG. 13 is an exemplary schematic diagram for explaining the case where an RMW operation by the RMW controller is canceled and a disk write operation is performed in the embodiment.

A description will be given of the case where a disk write operation is performed while an RMW operation is canceled. FIG. 13 is a schematic diagram for explaining the case where an RMW operation by the RMW controller 511 is canceled and a disk write operation is performed.

First, (1) the read/write controller 503 detects a write command that constitutes a sequential write operation from the command queue 551. The read/write controller 503 also detects that the buffer RAM 2 stores only fraction data and that rotational latency starts. With this, the wait controller 514 delays the start of an RMW operation by the RMW controller 511.

If a (sequential) write request is not received during data wait time, (2) the RMW controller 511 starts the RMW operation.

After that, (3) the receiver 501 receives remaining data together with a sequential write request. At that point, if possible, (4) the RMW operation by the RMW controller 511 is canceled.

(5) The write controller 512 adds the remaining data to the fraction data, and performs a disk write operation. On this occasion, if the cancellation of the RMW operation by the RMW controller 511 to allow the write controller 512 to perform the disk write operation requires the time taken for the magnetic disk 9 to rotate once, processing time is reduced compared to the case where an RMW operation is performed a plurality of times.

Referring back to FIG. 12, when the determination module 515 determines that the receiver 501 has not received remaining data (No at S1206), it is determined whether the RMW controller 511 completes the RMW operation (S1208). If it is determined that the RMW operation is not completed (No at S1208), the process is repeated from S1206.

On the other hand, if it is determined that the RMW controller 511 completes the RMW operation (Yes at S1208), it is determined that the write operation is completed, and the process from S1105 in FIG. 11 is performed.

Figure 14:
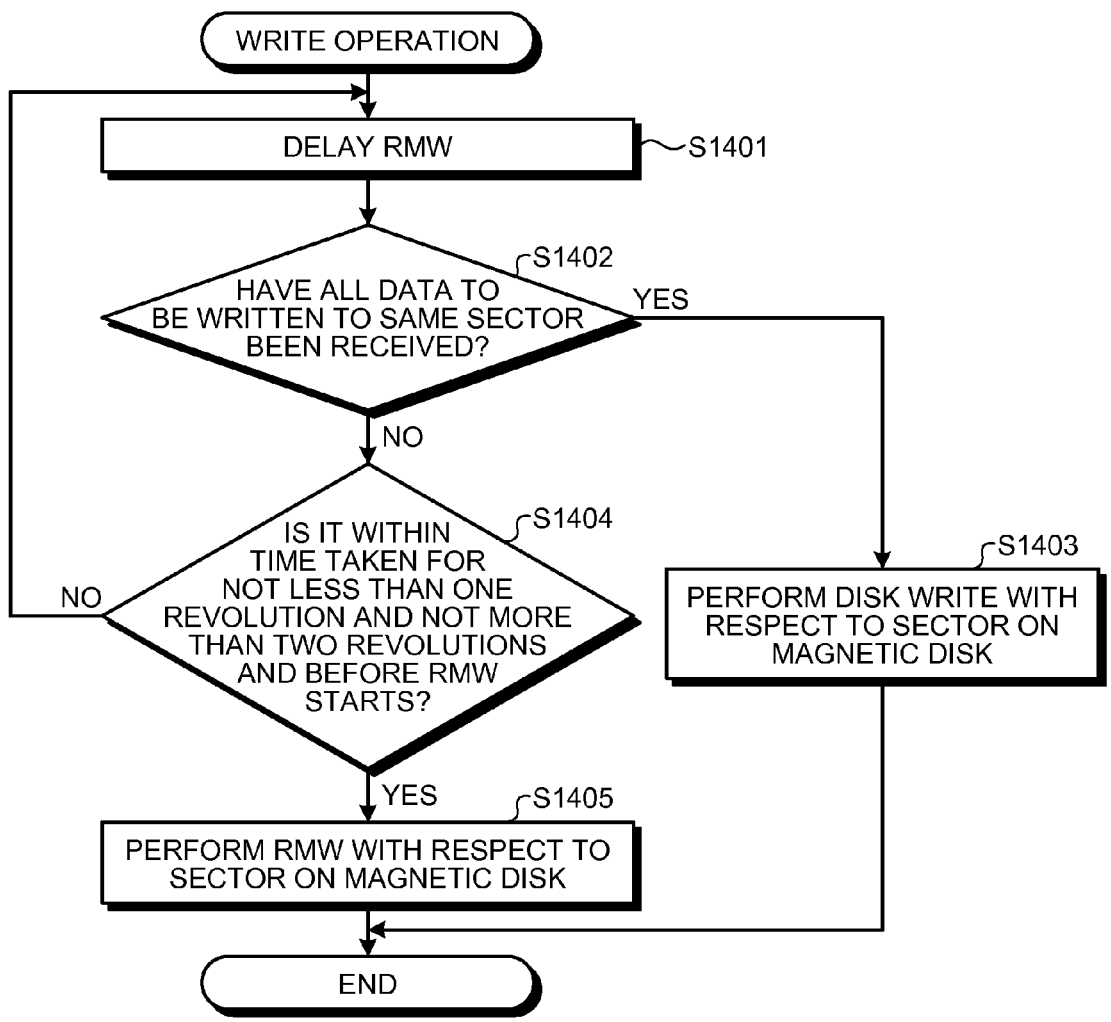
FIG. 14 is an exemplary flowchart of the operation of the HDD device for an RMW operation or a disk write operation when the data wait time is within two revolution time in the embodiment.

A description will then be given of the process at S1108 in FIG. 11 performed by the HDD device 100. FIG. 14 is a flowchart of the operation of the HDD device 100 for the above process.

First, the wait controller 514 delays the RMW operation by the RMW controller 511 using the fraction data (S1401).

The determination module 515 determines whether the receiver 501 has received remaining data together with a sequential write request (i.e., all data to be written to the same sector) (S1402).

When the determination module 515 determines that the receiver 501 has received remaining data (Yes at S1202), the RMW controller 511 cancels the RMW operation, and the write controller 512 performs a disk write operation with respect to a sector on the magnetic disk 9 (S1403).

On the other hand, when the determination module 515 determines that the receiver 501 has not received remaining data (No at S1402), the wait controller 514 determines whether it is within the time taken for the magnetic disk 9 to rotate not less than once and not more than twice just before preparation for the RMW operation starts (S1404). When the wait controller 514 determines that it is not the time just before preparation for the RMW operation starts (No at S1404), the process is repeated from S1401.

When the wait controller 514 determines that it is the time just before preparation for the RMW operation starts (Yes at S1404), the RMW controller 511 starts the RMW operation with respect to a sector on the magnetic disk 9 (S1405). At this point, if remaining data is received at the time when an RMW operation can be canceled, the RMW operation may be canceled. In such a case, the same process as described previously in connection with FIG. 12 is performed, and the description will not be repeated.

In the embodiment, wait time, when extended, is set to within the time taken for the magnetic disk 9 to rotate twice. However, it is not so limited, and extended wait time may be set to within the time taken for the magnetic disk 9 to rotate a plurality of times (three times or more). Further, while the embodiment is described above as being applied to an HDD device, it may be applied to other devices that perform write control with respect to a disk medium.

According to the embodiment, the HDD device 100 can determine optimal timing to perform an RMW operation with respect to a magnetic disk device in a long sector format. Thus, it is possible to eliminate wasteful rotational latency as well as to reduce the power consumption and the performance degradation due to an RMW operation.

Further, according to the embodiment, the HDD device 100 waits for the receipt of all data corresponding to sequential write requests until the time (or a medium position) just before preparation for pre-read for an RMW operation starts, and immediately starts the RMW operation at the time. Thus, when a random access command is received next, it is possible to eliminate wasteful rotational latency upon performing the RMW operation.

Still further, according to the embodiment, the determination module 515 of the HDD device 100 determines whether all data corresponding to sequential write requests have been received after the start of an RMW operation. If all the data has been received, the determination module determines that sequential access is performed. Accordingly, the determination module 515 extends the data wait time of the wait controller 514 by the time taken for the magnetic disk 9 to rotate once such that the start of an RMW operation is delayed by the one revolution time at the next time and thereafter. If a sequential write request is received and thereby all the data are received during the extended wait time, a write operation can be performed by combining the data. Thus, a wasteful RMW operation can be avoided, which reduces the degradation of the sequential write performance.

Still further, according to the embodiment, if all data corresponding to sequential write requests have not been received during wait time after the wait time is extended, the determination module 515 determines that sequential access ends. Accordingly, the determination module 515 restores the extended wait time of the wait controller 514, i.e., timing to start an RMW operation, to its original state. Thus, the time until an RMW operation starts can be reduced.

Furthermore, according to the embodiment, since wasteful rotational latency and RMW operation can be eliminated as described above, power saving can be achieved, resulting in less power consumption.

The control program executed on the HDD device 100 of the embodiment may be provided as being stored in advance in ROM or the like.

The control program may also be provided as being stored in a computer-readable storage medium, such as a compact disk read-only memory (CD-ROM), a flexible disk (FD), a compact disc-recordable (CD-R), or a digital versatile disc (DVD), in an installable or executable format.

The control program may also be stored in a computer connected via a network such as the Internet so that it can be downloaded therefrom via the network. Further, the control program may be provided or distributed via a network such as the Internet.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A disk controller comprising:
a receiver configured to receive data in units of predetermined data length;
a read-modify-write controller configured to perform a read-modify-write operation when the receiver receives data to write the data to a sector on a disk medium rotation of which is controlled, the sector being longer than the predetermined data length; and
a delay controller configured to perform a wait operation to delay start of control for the read-modify-write operation by the read-modify-write controller until target start time within a period in which the disk medium rotates once, the target start time indicating time obtained by subtracting control time required to control pre-reading of the sector from time at which the pre-reading for the read-modify-write operation starts with respect to the sector.

2. The disk controller of claim 1, further comprising a write controller configured to control a write operation when the receiver further receives data during the wait operation and an amount of received data reaches size of the sector, to write a combination of data previously received and the data further received to the sector, wherein
if an amount of received data does not reach the size of the sector when the receiver further receives data, the delay controller continues the wait operation.

3. The disk controller of claim 2, wherein, when the receiver further receives data after the target start time within the period in which the disk medium rotates once, the delay controller delays start of control for a subsequent read-modify-write operation until next target start time within a period in which the disk medium rotates a predetermined number of times not less than two, the next target start time indicating time obtained by subtracting the control time required to control the pre-reading of the sector from time at which the pre-reading for the read-modify-write operation starts with respect to the sector.

4. The disk controller of claim 3, wherein, when the receiver receives no data until the next target start time within the period in which the disk medium rotates the predetermined number of times while the delay controller is delaying the start of the control for the read-modify-write operation, the delay controller changes time to start the control for the read-modify-write operation to the target start time within the period in which the disk medium rotates once.

5. The disk controller of claim 4, wherein
when the receiver further receives data after the control for the read-modify-write operation starts and an amount of received data reaches the size of the sector, the read-modify-write controller cancels the read-modify-write operation, and
the write controller is configured to perform the write operation when the read-modify-write controller cancels the read-modify-write operation to write a combination of the data previously received and the data further received to the sector.

6. A disk drive device comprising:
a rotation controller configured to control rotation of a disk medium;
a receiver configured to receive data in units of predetermined data length;
a read-modify-write controller configured to perform a read-modify-write operation when the receiver receives the data to write the data to a sector on the disk medium, the sector being longer than the predetermined data length; and
a delay controller configured to delay start of control for the read-modify-write operation by the read-modify-write controller until target start time within a period in which the disk medium rotates once, the target start time indicating time obtained by subtracting control time required to control pre-reading of the sector from time at which the pre-reading for the read-modify-write operation starts with respect to the sector.

7. The disk drive device of claim 6, further comprising a write controller configured to perform a write operation when the receiver further receives data to write a combination of the data to the sector when the read-modify-write controller cancels the read-modify-write operation.

8. The disk drive device of claim 7, wherein, when the receiver further receives data after the target start time within the period in which the disk medium rotates once, the delay controller delays start of control for a subsequent read-modify-write operation until next target start time within a period in which the disk medium rotates a predetermined number of times not less than two, the next target start time indicating time obtained by subtracting the control time required to control the pre-reading of the sector from time at which the pre-reading for the read-modify-write operation starts with respect to the sector.

9. The disk drive device of claim 8, wherein, when the receiver receives no data until the next target start time within the period in which the disk medium rotates the predetermined number of times while the delay controller is delaying the start of the control for the read-modify-write operation, the delay controller changes time to start the control for the read-modify-write operation to the target start time within the period in which the disk medium rotates once.

10. The disk drive device of claim 9, wherein
when the receiver further receives data after the control for the read-modify-write operation starts and an amount of received data reaches the size of the sector, the read-modify-write controller cancels the read-modify-write operation, and
the write controller is configured to perform the write operation when the read-modify-write controller cancels the read-modify-write operation to write a combination of the data previously received and the data further received to the sector.

11. A disk control method comprising:
controlling rotation of a disk medium;
receiving data in units of predetermined data length;
performing a read-modify-write operation upon receipt of the data to write the data to a sector on the disk medium, the sector being longer than the predetermined data length; and
delaying start of control for the read-modify-write operation until target start time within a period in which the disk medium rotates once, the target start time indicating time obtained by subtracting control time required to control pre-reading of the sector from time at which the pre-reading for the read-modify-write operation starts with respect to the sector.

* * * * *